(12) United States Patent
Takamatsu

(10) Patent No.: US 7,666,542 B2
(45) Date of Patent: Feb. 23, 2010

(54) FLAT BATTERY AND BATTERY PACK

(75) Inventor: Toshifumi Takamatsu, Sagamihara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 317 days.

(21) Appl. No.: 11/454,191

(22) Filed: Jun. 15, 2006

(65) Prior Publication Data

US 2006/0286452 A1    Dec. 21, 2006

(30) Foreign Application Priority Data

Jun. 16, 2005  (JP)  ............................. 2005-176738
Mar. 20, 2006  (JP)  ............................. 2006-077454

(51) Int. Cl.
*H01M 2/08* (2006.01)
(52) U.S. Cl. ............................. 429/90; 429/92; 429/152
(58) Field of Classification Search .................. 429/185, 429/152, 162, 90, 65, 92, 93, 157
See application file for complete search history.

(56) References Cited

U.S. PATENT DOCUMENTS

| 6,387,566 B1 | 5/2002 | Chang et al. |
| 2005/0130037 A1 | 6/2005 | Kaneta et al. |

FOREIGN PATENT DOCUMENTS

| EP | 1 071 147 A1 | 1/2001 |
| JP | 2001 093495 A | 4/2001 |
| JP | 2001 229890 A | 8/2001 |
| JP | 2003 045492 A | 2/2003 |
| JP | 2004-087238 | 3/2004 |
| JP | 2004-227921 | 8/2004 |
| JP | 2004-319362 | 11/2004 |
| JP | 2005-071784 | 3/2005 |
| JP | 2004-087238 | * 3/2008 |
| WO | WO 03/092097 A1 | 11/2003 |
| WO | WO 2006/068373 A1 | 6/2006 |

OTHER PUBLICATIONS

European Patent Application No. 06253102.5 Search Report dated Oct. 16, 2006.

* cited by examiner

*Primary Examiner*—Patrick Ryan
*Assistant Examiner*—Monique Wills
(74) *Attorney, Agent, or Firm*—Young Basile

(57) ABSTRACT

The invention is directed towards flat battery for use in a battery pack. The flat battery includes an electrode terminal that conducts to the exterior of the exterior member and connects to the battery elements within the interior region. Electrode terminals of the flat battery are formed using a connection section, and a voltage detection section that connects a voltage detection line to a control device that detects an output voltage. A notch established between the connection section and the voltage detection section mutually separates the connection section and the voltage detection section. Because of a difference in thickness between spacer sections between the connection sections and the voltage detection section, the connection section is moveable in the lamination direction of the flat battery between the spacers, while the voltage detection section is fixed.

10 Claims, 10 Drawing Sheets

FLAT BATTERY AND BATTERY PACK

This application claims priority from Japanese Patent Application No. 2006-077454, filed Mar. 20, 2006, and Japanese Patent Application No. 2005-176738, filed Jun. 16, 2005, the entire content of each of which is incorporated herein by reference.

TECHNICAL FIELD

The invention relates to flat batteries and battery packs that use flat batteries.

BACKGROUND

Recently, there has been a focus on flat secondary batteries (below called flat batteries) which are light weight and thin. Flat batteries include battery elements, battery tabs (electrode terminals), and battery exteriors which are formed by laminated sheets. The battery's exterior is formed by jointing together the outer peripheral edges of the two laminated sheets, and enclosing the battery's elements and electrolyte. Battery elements are provided by laminated electrodes in which positive electrodes including a positive electrode active material layer and negative electrodes including a negative electrode active material layer are alternately stacked by means of spacers. The electrode tab (electrode terminal) is connected to the battery's elements and conducts current for the battery's elements from inside the battery to outside the battery.

A battery pack may be formed from a plurality of flat batteries. The flat batteries are stacked, and the companion electrode tabs are connected by welding and the like. The battery pack is appropriate for use with electric automobiles which require high power or hybrid automobiles and the like. With this type of battery pack, the voltage detection line is connected to the electrode terminal of every flat battery, and voltage is detected by a control device. Based on the detection results, charging and discharging of every flat battery is controlled.

SUMMARY

In general, the invention is directed towards flat battery for use in a battery pack, in which the flat battery includes battery elements that generate power, and an exterior member that seals the battery elements within an interior region thereof. The flat battery further includes plate-shaped battery terminals that conduct to the exterior of the exterior member and connect to the battery elements within the interior region. The terminals of the flat battery have an output section and a voltage detection section that connects a voltage detection line to a control device that detects an output voltage. A notch between the output section and the voltage detection section separates the connection section and the voltage detection section.

In one embodiment, a flat battery includes a battery element, and an exterior member that seals the battery elements, wherein the battery element is within an interior region of exterior member. The flat battery further includes an electrode terminal that conducts to the exterior of the exterior member and connects to the battery elements within the interior region. The electrode terminal includes an output section, a voltage detection section, and a notch between the output section and the voltage detection section.

In another embodiment, a battery pack comprises a plurality of flat batteries, each of the flat batteries including battery elements that generate power and an exterior member that seals the battery elements within an interior region thereof. Each of the flat batteries further includes plate-shaped electrode terminals that conduct to the exterior of the exterior member and connect to the battery elements within the interior region, wherein the electrode terminals comprise a output section, and a voltage detection section that connects a voltage detection line to a control device that detects an output voltage. The electrode terminals further include a notch between the output section and the voltage detection section to separate the output section and the voltage detection section. The flat batteries are serially connected so that the output sections of the flat batteries are connected together.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

For purposes of illustration, the thicknesses and sizes of the battery components may be exaggerated.

DETAILED DESCRIPTION

Figure 1:
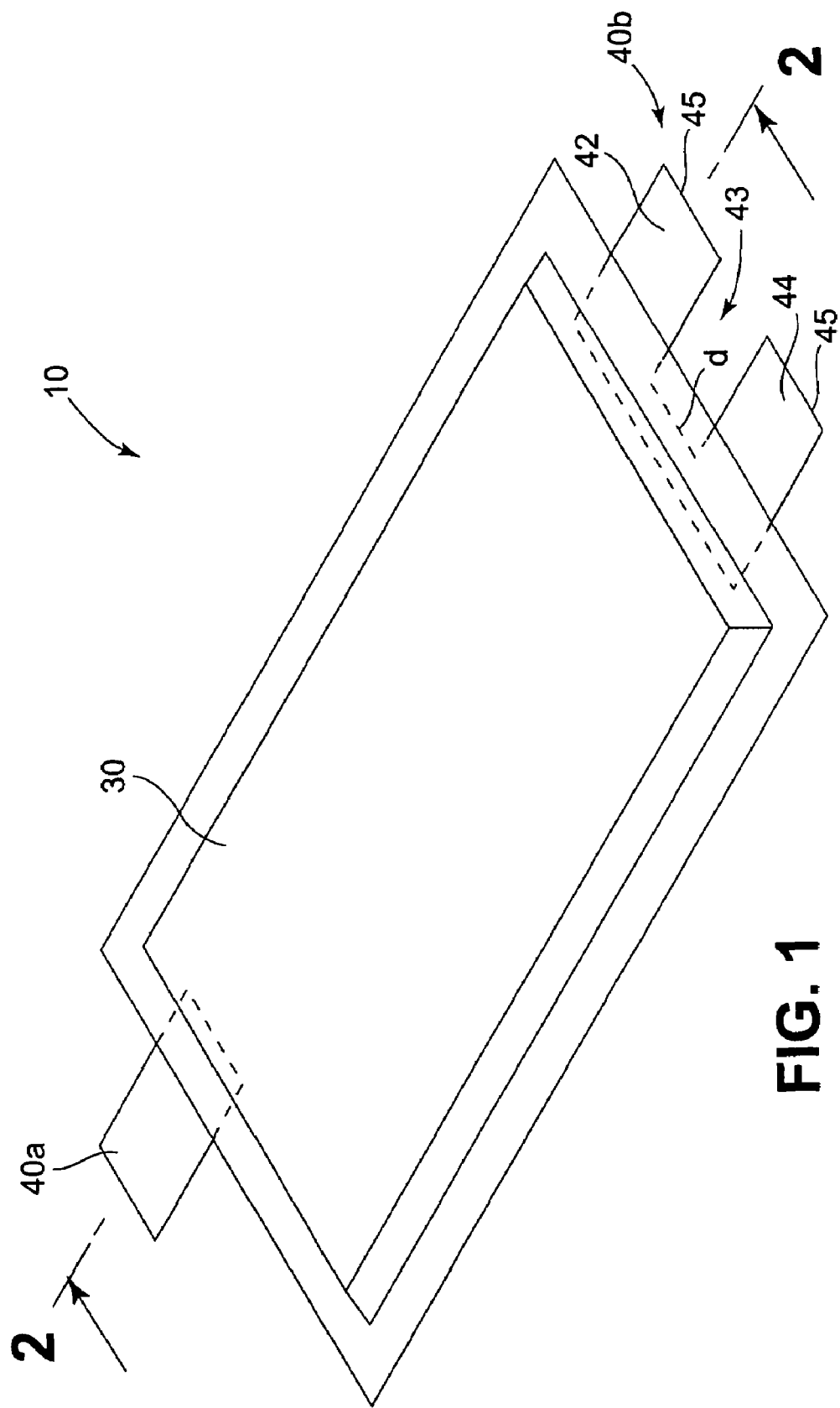
FIG. 1 is a perspective view which shows one example of a flat battery.
Figure 2:
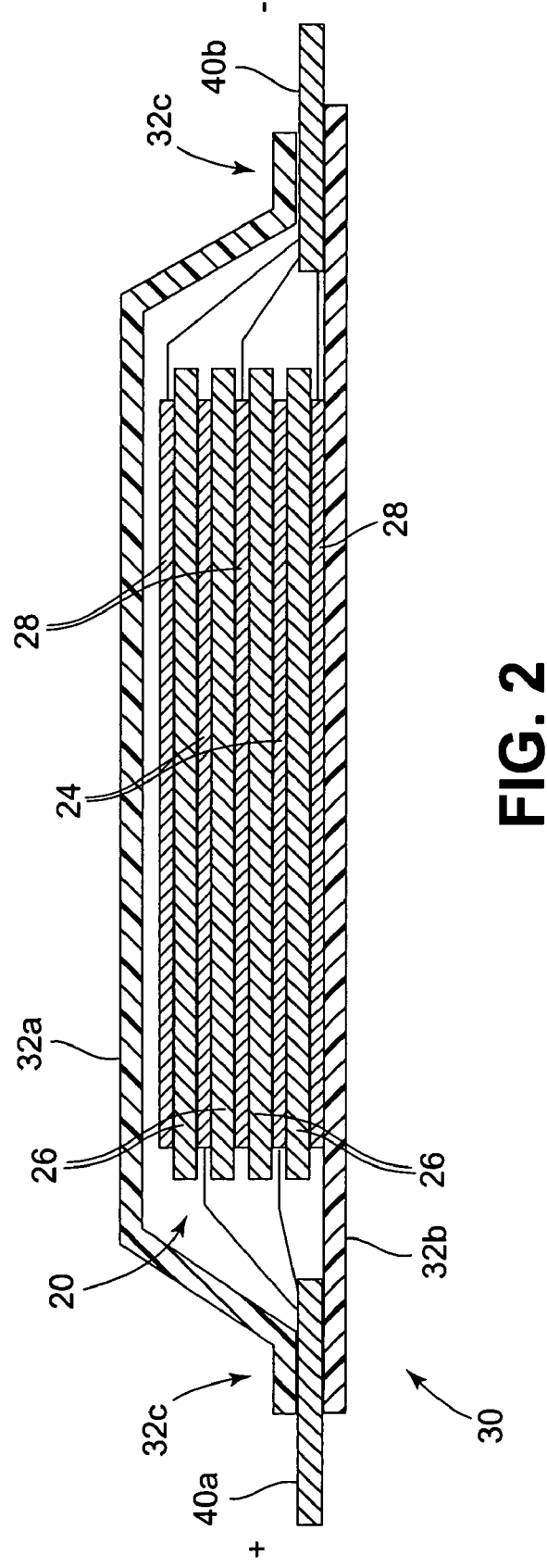
FIG. 2 is a cross-sectional diagram along the 2-2 line of FIG. 1.

As shown in FIG. 1 and FIG. 2, the flat battery 10 has a battery element 20 which generates power, and an exterior member or enclosure 30 that seals the battery's element 20 from the environment. The battery 10 further includes substantially flat plate-shaped terminal tabs (electrode terminals) 40a, 40b. The electrode terminals extend from the interior of the exterior member 30 to the exterior.

As shown in FIG. 2, the battery's element 20 is formed by stacking positive electrode plates 24, separators 26, and negative electrode plates 28. The positive electrode plate 24 is made of a positive electrode active material layer, and the negative electrode plate 28 is made of a negative electrode active material layer.

The exterior member 30 encapsulates and maintains the battery's element 20. The exterior member 30 is formed by two laminate sheets (sheet members) 32a and 32b. The laminate sheet members 32a and 32b preferably have a 3-layer structure including a core layer of a conductive metal such as, for example, aluminum, covered on each major surface by a resin layer, but many other constructions are possible. In one embodiment, because the laminate sheet 32a, in at least one direction, establishes a space which encapsulates the battery's element 20, it is convex-shaped, while the member 32b is substantially flat. The outer edges of the laminate sheets 32 are joined by heat sealing, and the members 32a, 32b are adjacent one another in a junction region 32c to seal battery's element 20 within the exterior member 30.

The electrode tabs 40a and 40b are respectively connected to a positive electrode plate 24 and a negative electrode plate 28 of the battery's element, and the electrode tabs 40a, 40b form output terminals that transmit power from the battery's element 20.

The electrode tab 40a, for example, is a substantially flat plate-shaped positive electrode terminal that is made of a conductive material, preferably aluminum. The electrode tab 40a is connected to a positive electrode plate 24 of the battery's element 20, and extends between the two laminated sheets 32a and 32b to the outside of the exterior member 30.

In addition, the electrode tab 40b is a substantially flat, plate-shaped member which is formed from a conductive material, preferably copper. The electrode tab 40b is connected to a negative electrode plate 28 of the battery's element 20 in the interior of the exterior 30, and extends between the two laminated sheets 32a and 32b to the outside of the exterior member 30.

Referring to FIG. 1, the electrode tab 40b includes an output section 42 and a voltage detection section 44. The output section 42 and the voltage detection section 44 of the electrode tab 40b are separated by an elongate notch 43 that extends at least along at least a portion of the length of the electrode tab 40b to the outside of the exterior member 30 and terminates at a tip region 45 of the electrode tab 40b.

The output section 42, when a plurality of flat batteries 10 as will be described is electrically connected as a battery pack, connects to the electrode tab 40a so that the batteries 10 can be connected together. Because the voltage detection section 44 detects the voltage of the flat batteries 10 when the flat batteries 10 are assembled in a battery pack, as shown in the later described FIG. 6, there results a detecting terminal which is connected by a control device 80 (voltage detection means) and a voltage detection line 75.

Here, as shown by the dotted line in FIG. 1, from the position located between the two laminated sheets 32a, 32b in the junction region 32c of the laminated sheet, a notch 43 is established that extends from the junction region 32c and outward to the tip region 45, which is exposed to the exterior of the previously described exterior member 30. It is desirable that the output section 42 and the voltage detection section 44 be detached. That is, it is desirable for the branching point d which is detached from the output section 42 and the voltage detection section 44 to be sandwiched at the junction region 32c.

Figure 3:
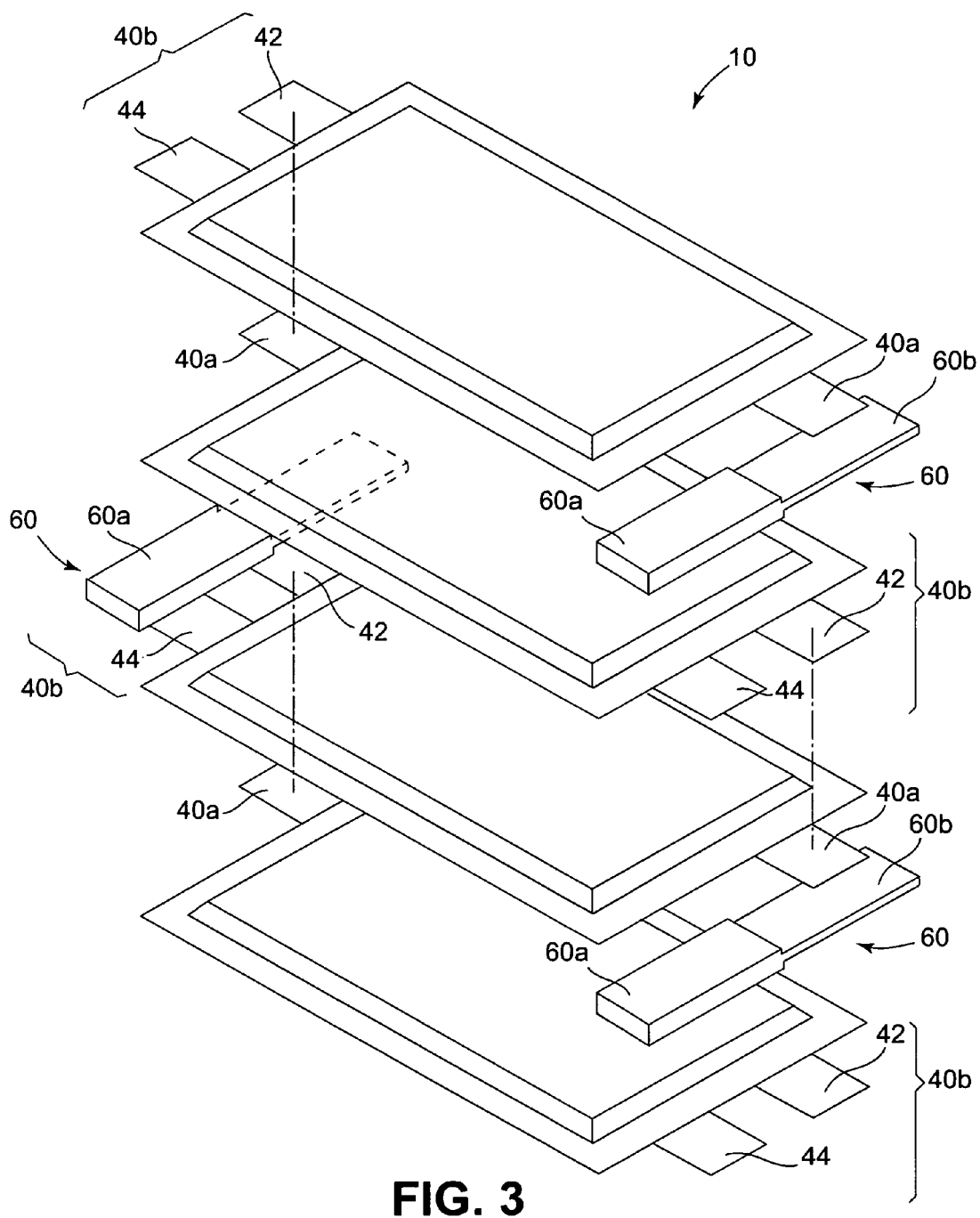
FIG. 3 is a perspective view which shows the appearance of the lamination of a plurality of flat batteries.

A plurality of above-mentioned flat batteries 10 may be serially connected to form a battery pack 50. FIG. 3 is a perspective view which shows the battery pack 50, which is formed from a plurality of stacked flat batteries 10. As shown in FIG. 3, to make the battery pack 50, the flat battery 10 of FIGS. 1-2 and mirror symmetric batteries 10 are alternately stacked together.

Here, the electrode tab 40a and the electrode tab 40b are alternately arranged in the stack direction. In addition, the output sections 42 of the electrode tab 40b and the electrode tabs 40a are aligned in the stack direction of the flat battery 10, and the orientation of the flat battery 10 is determined.

From this determination, along with the output section 42 of the electrode tab 40b and electrode tab 40a being arranged in a row in the stack direction, the voltage detection section 44 is also arranged in a row in the stack direction.

When an electrode tab 40a of some flat battery and the output section 42 of top laminate of other flat batteries are connected, the output section 42 of the flat battery 10 is connected with the electrode tab 40a of the lower layer of other flat batteries. In addition, the connection section 42 (below, simply referred to a connection section 42) of the electrode tab 40b and the unconnected electrode tab 40a which are arranged together in the stack direction will short-circuit if connected. Plate-shaped spacers 60 are arranged as insulators between the electrode tab which is not connected and the output section 42 so that there is no contact with the electrode tab which is not connected and the output section 42 or the electrode tabs 40a of the flat batteries which are adjacent in stack direction and the output section 42. For the spacers 60 which are stacked at the center, as shown in FIG. 3, the thickness in region 60a at the location which stacks with the voltage detection part 44 is thicker than the position in region 60b which stacks with the output section 42. However, the spacer 60 which is established at the outermost layer in the stack direction has a uniform thickness.

In FIG. 3 there is shown an example of stacking four flat batteries in order to simplify the explanation, but in reality, more than four batteries may be used. For example, a battery pack may be formed from stacked eight flat batteries 10. The battery pack as shown in FIG. 4 results from stacked eight flat batteries and four sheets of spacers 60.

Figure 4:
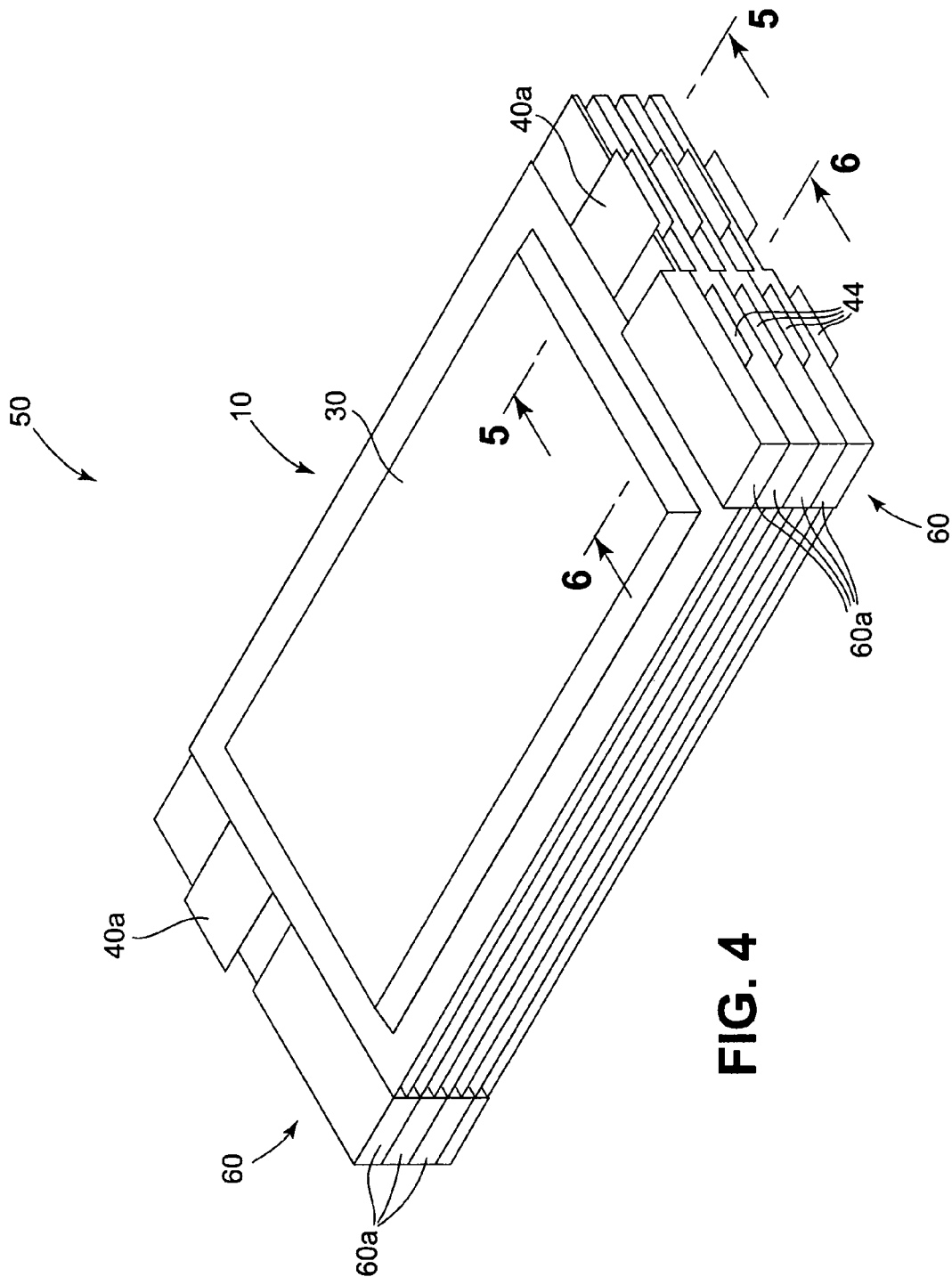
FIG. 4 is a perspective view which shows a battery pack that has laminated a plurality of flat batteries.
Figure 5:
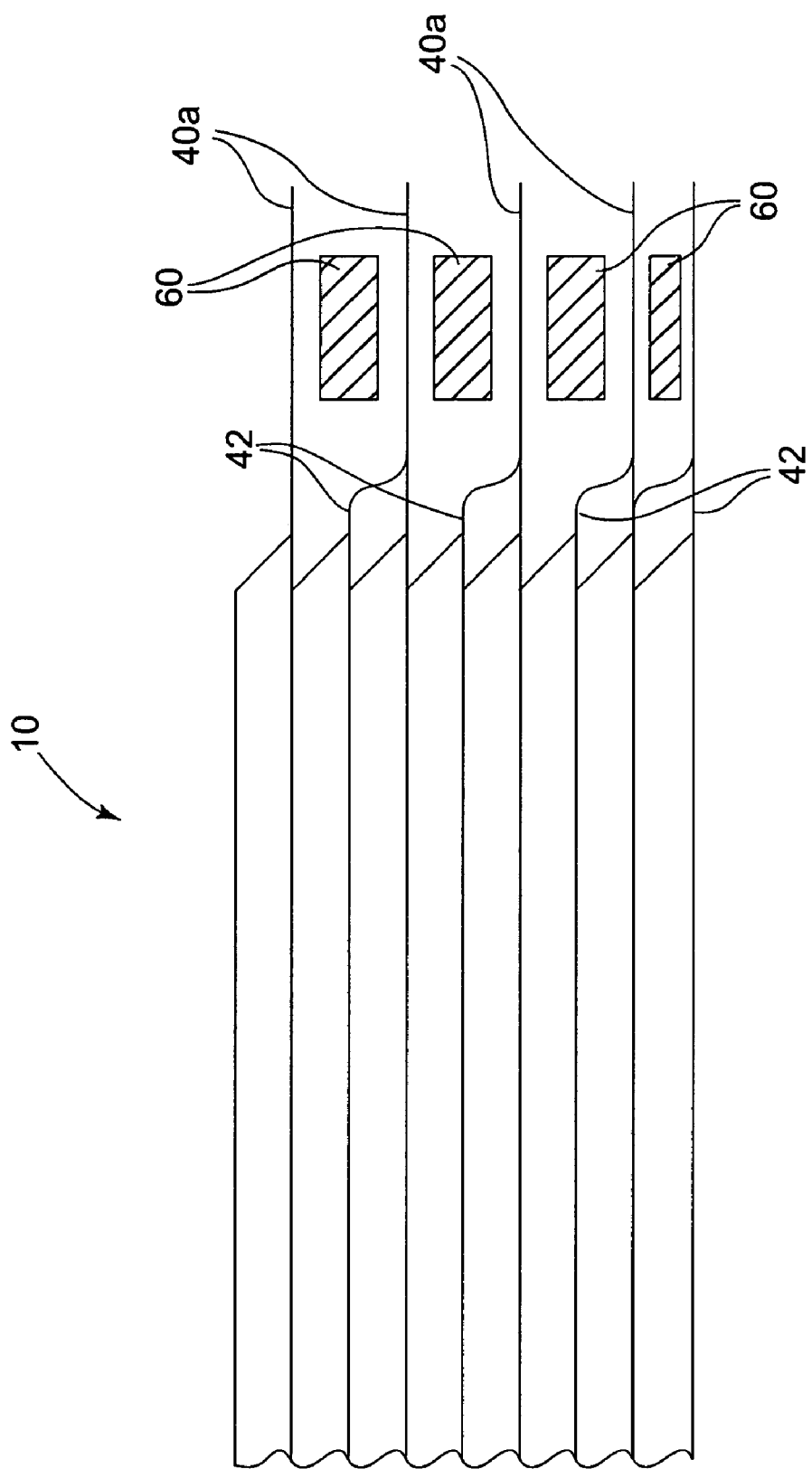
FIG. 5 is a cross-sectional view seen along the 5-5 line of FIG. 4.
Figure 6:
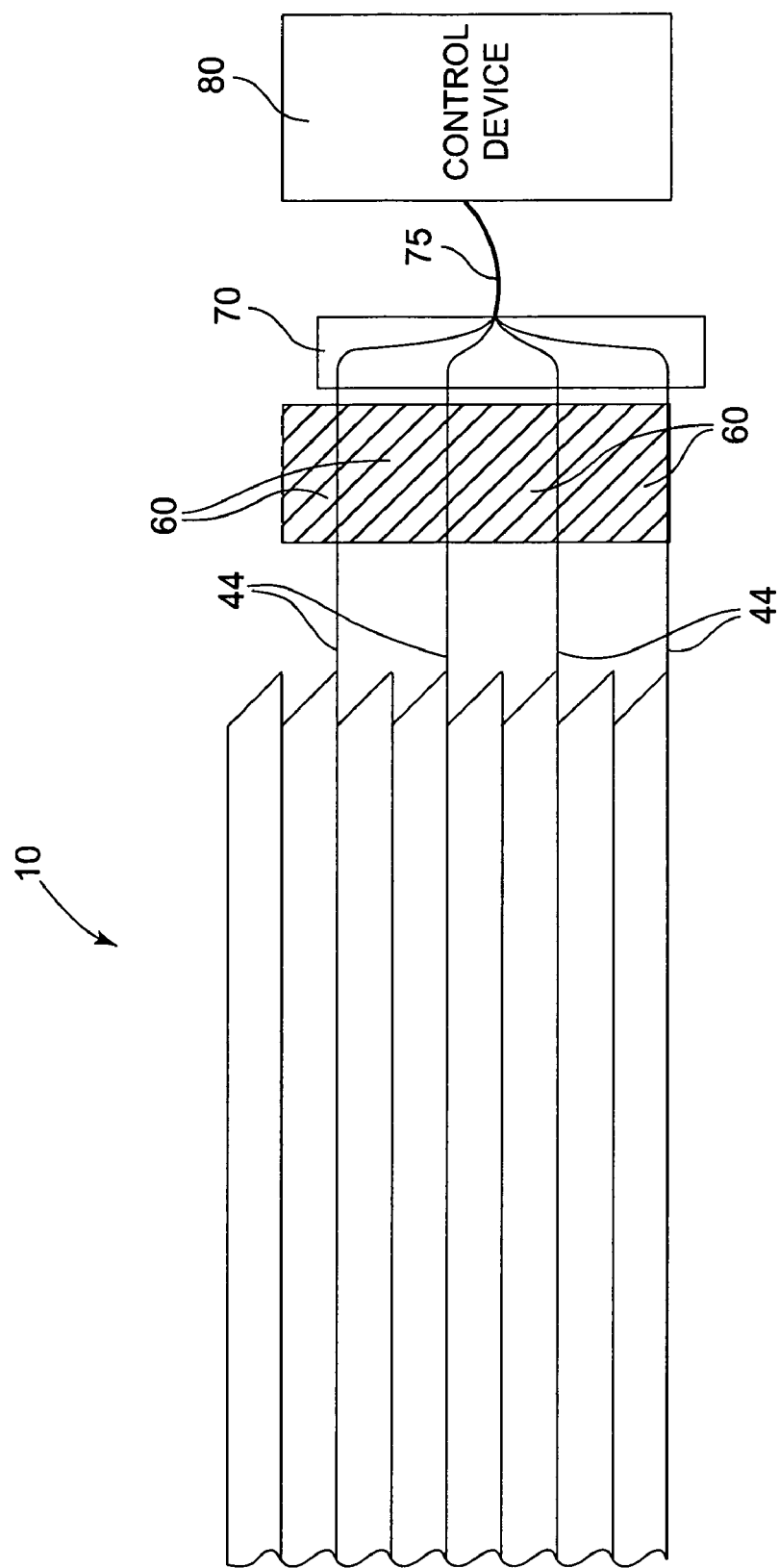
FIG. 6 is a cross-sectional view seen along the 6-6 line of FIG. 4.

FIG. 4 is a perspective view which shows the battery pack 50 which has stacked a plurality of flat batteries 10, and FIG. 5 is a cross-sectional view seen along the 5-5 of FIG. 4, and FIG. 6 is a cross-sectional view seen along the 6-6 line of FIG. 4. FIGS. 4-6 show a battery pack with eight flat batteries 10 stacked.

As shown in FIG. 4 and FIG. 5, the output section 42 of the electrode tab 40b and electrode tab 40a are connected at the gap between the spacers 60. Because there is a gap between the spacers 60, the connection section 42 is not fixed with respect to the battery stack direction, that is, it is moveable. On the one hand, as shown in FIG. 4 and FIG. 6, the voltage detection part 44 is sandwiched by the spacer 60, and it is fixed at a fixed pitch. Into the fixed battery detection section, as shown in FIG. 6, there is easily inserted a multiple electrode-type connector 70 so as to be able to connect once with every voltage detection section 44 by bundling the voltage detection line 75. The inserted multiple electrode-type connector 70 is connected to the control device 80 as shown in FIG. 6 by means of the voltage detection line 75, and based on the flat battery 10's voltage values which are detected separately, there results control of the degraded state of each flat battery or charging and discharging.

As shown above, it is possible to form the battery pack 50 by connecting flat batteries 10. The effect of this embodiment's flat battery 10 and battery pack 50 is shown as follows. According to this implementation's flat battery 10, the electrode tab 40b is separated into the output section 42 and the voltage detection part 44. When there is detection of voltage for the flat battery 10, the control device 80 connects to the voltage detection part 44 by means of the voltage detection line 75. Consequently, even when using the flat battery 10 in a high vibration environment such as in a vehicle, the vibration of the voltage detection line 75 is less likely to reaches the output section 42. As a result, the output section 42 is not fractured by the stress of the vibration, and the output of flat battery 10 is not disconnected.

In addition, the electrode tab 40*b* branches to the output section 42 and the voltage detection part 44 in the direction of the tip 45 of the electrode tab 40*b* from a position d (FIG. 1) which is pinched by the junction region 32*c* of the laminated sheets 32*a*, 32*b* through the establishment of a notch. That is, the branch point which forms the output section 42 and the voltage detection part 44 is at the center of the junction region 32*c* of the laminated sheets 32*a*, 32*b*. Consequently, improving the strength of the branch point periphery of the electrode tab 40*b* can help to prevent fracturing of the electrode tab 40*b*.

According to this implementation's battery pack 50, the thickness dimension of the region 60*a* site which was stacked with the voltage detection part 44 of the spacer 60 which was stacked in common with the electrode tab 40*a* is thicker than the thickness of the region 60*b* which was stacked with the output section 42. Because of this difference in thickness, the output section 42 is moveable (i.e., capable of slight movement) in the stack direction of the flat battery between the spacers 60. In contrast, if both the output section 42 and the voltage detection section 44 are fixed with respect to the stack direction of flat battery 10, when the vibration differs between the voltage detection section and the flat battery 44 is input, with a concentration of the stress from the vibration difference of the voltage detection line 75 and flat battery 10 with the output section 42 and the voltage detection section 44, there is concern about a reduction in life of the output section. In the present embodiment of the invention, however, because the output section 42 is not fixed, it is possible to prevent a concentration of stress, as there is shaking as one unit with the flat battery. As a result, it is possible to prevent a reduction in the life of the output section 42, and it is possible to prevent a reduction in the electrical reliability of the flat battery 10 companions.

In addition, if the position of the voltage detection part 44 is fixed, it is relatively simple to insert multiple electrode-type connectors. When the position of the voltage detection part 44 is not fixed, the position in the stack direction of the flat battery the voltage detection part section 44 becomes free, and it is not easy to insert multiple electrode-type connectors.

Moreover, in the above-mentioned embodiment, as shown in FIG. 1, there is detachment of the electrode tab 40*b* in such a way that a gap becomes possible by establishing a notch at the output section 42 in the voltage detection part 44. However, the invention is not limited to this arrangement.

Figure 7:
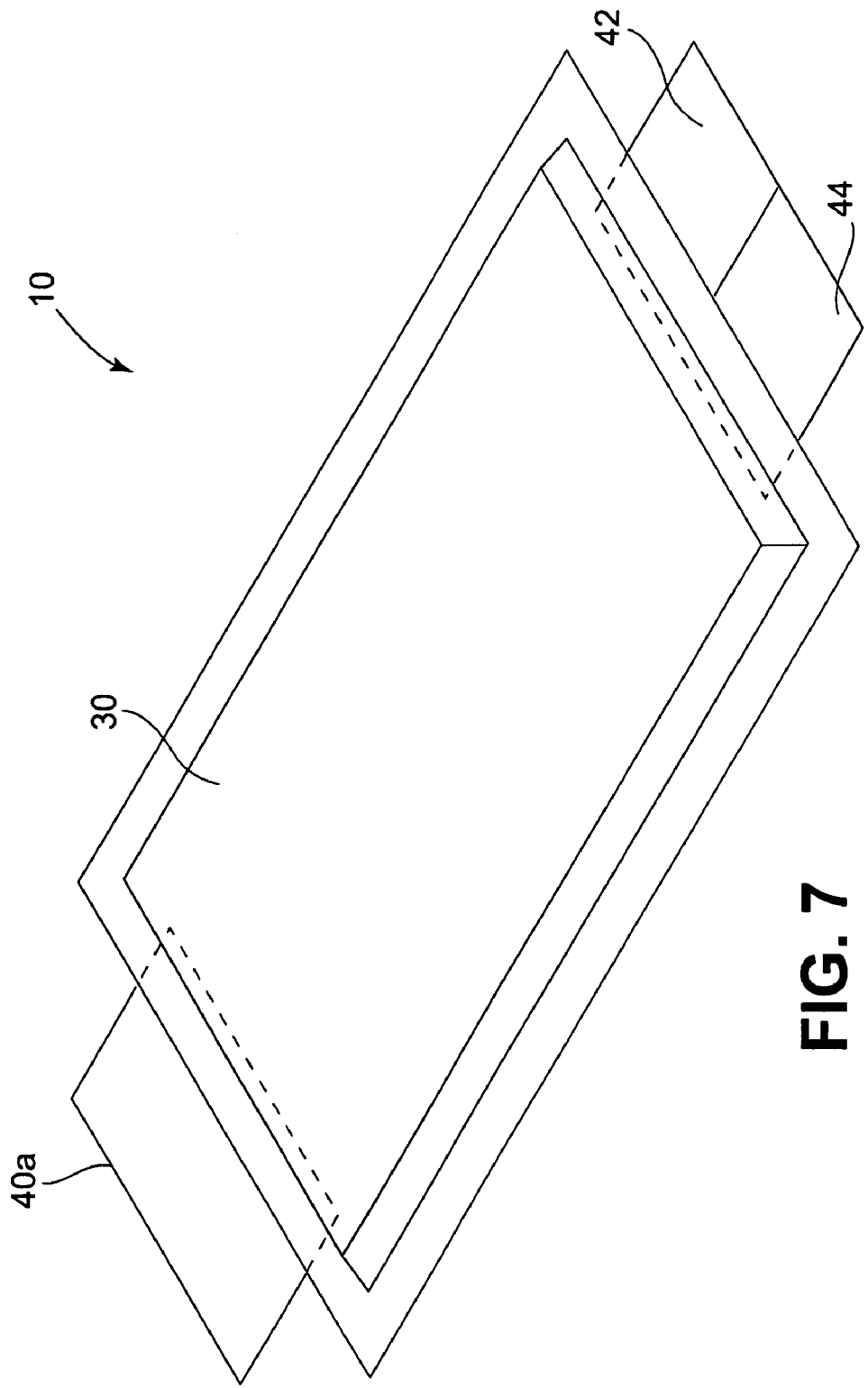
FIG. 7 is a perspective view which shows another flat battery.

FIG. 7 is a perspective view which shows another flat battery 10. As shown in FIG. 7, there is simply inserted a notch at the electrode tab 40*b*, and there may be detachment from output section 42 and the voltage detection part 44. The notch may be simply cut, or may be appropriately changed for a fine slit.

Figure 8:
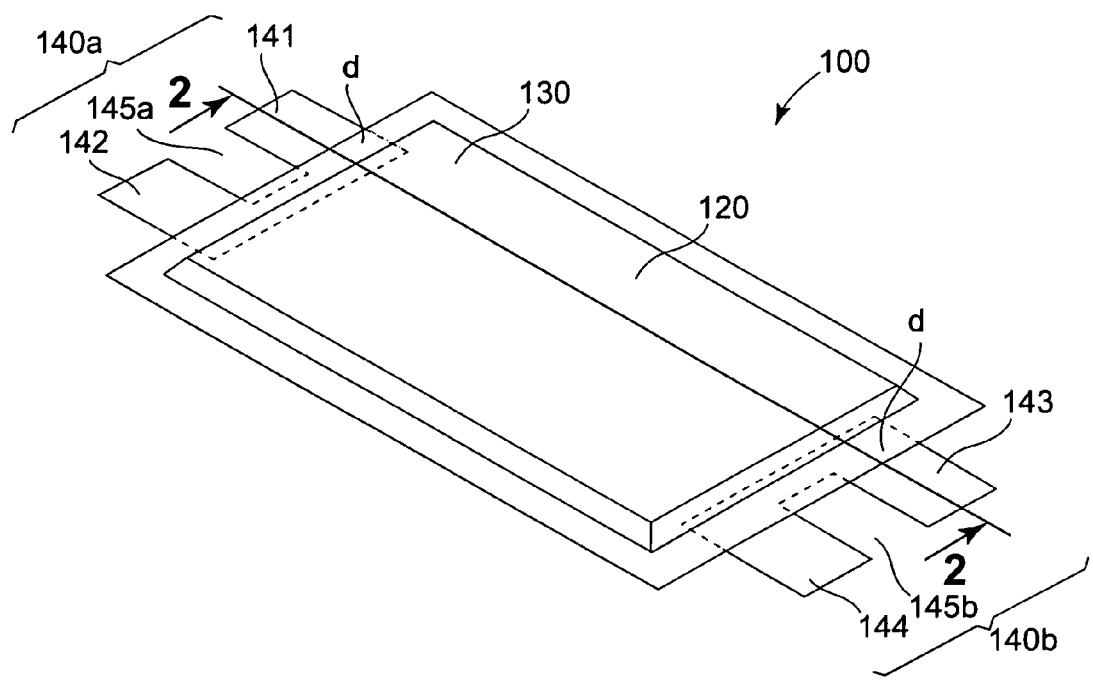
FIG. 8 is a perspective view which shows one example of the flat battery which is related to Embodiment 2.

FIG. 8 is a perspective view of one example of a flat battery. Because the 2-2 cross-sectional view of the flat battery which is shown in FIG. 8 is identical to the cross-sectional view which is shown in FIG. 2, its explanation is omitted. As shown in FIG. 8, the flat battery 100 has the battery element 120 which generates power, the exterior member 130 which seals the battery element 120, and the plate-shaped electrode tabs (electrode terminals) 140*a* and 140*b* which are drawn to the outside from the 2 peripheries which face the exterior member 130.

The electrode tab 140*a* is, for example, a plate-shaped positive electrode terminal which is formed from a conductive material, preferably aluminum. The electrode tab 140*a* connects to the positive electrode plate 24 (reference FIG. 2) of the battery element 120, and extends from the junction region 32*c* between the laminated sheets 32*a*, 32*b* of the exterior member 130.

In addition, the electrode tab 140*b* is, for example, a plate-shaped negative electrode terminal which is formed from a conductive material, preferably copper. The tab 140*b* connects to the negative electrode plate 28 of the battery 120 within the exterior member 130, and extends outwardly from the junction region 32*c* between the laminated sheets 32*a*, 32*b* of the exterior member 130.

There is a notch 145*a*, 145*b* established, for the electrode tab 140*a* and the electrode tab 140*b*, respectively, which extends in the lead out direction of the electrode tabs 140*a*, 140*b* respectively to the part that is drawn out to the outside of exterior member 130. The notch 145*a* separates the electrode tab 140*a* into an output section 141 and an electrode detection section 142. In addition, the notch 145*b* separates the electrode tab 140*b* into an output section 143 and a voltage detection section 144.

Each voltage detection section 142, 144 of the electrode tabs 140*a* and 140*b* are used as voltage detection sections for detecting the voltage of the flat battery 100. The output section 143 of each flat battery, when there is a plurality of flat batteries 100, as described later, which electrically connects as a battery pack, connects with the electrode tab 141 of other flat batteries 100. By this connection, all the flat batteries 100 which formed the battery pack are serially connected. The voltage detection section 144 is used as a terminal in order to detect the voltage of the flat batteries 100 which are assembled as a battery pack, and are connected by means of the voltage detection line 175 to the control device 180 (voltage detection means) which is shown in the later described FIG. 11.

Here, as shown by the dotted line in FIG. 8, for the electrode tabs 140*a*, 140*b*, a notch is established from the location d which is located between the two laminated sheets 32*a*, 32*b* at the junction region 32*c* which is shown in FIG. 2 until the edge part which is exposed to the outside of the previously described exterior member 130, and it is desirable that there is separation between the output sections 141, 143 and the voltage detection sections 142, 144. It goes without saying, that it is desirable that the branch point which separates the connection section 141 and the voltage detection section 142 and the output section 143 and the voltage detection section 144 are pinched between the laminated sheets 32*a*, 32*b*.

Figure 9:
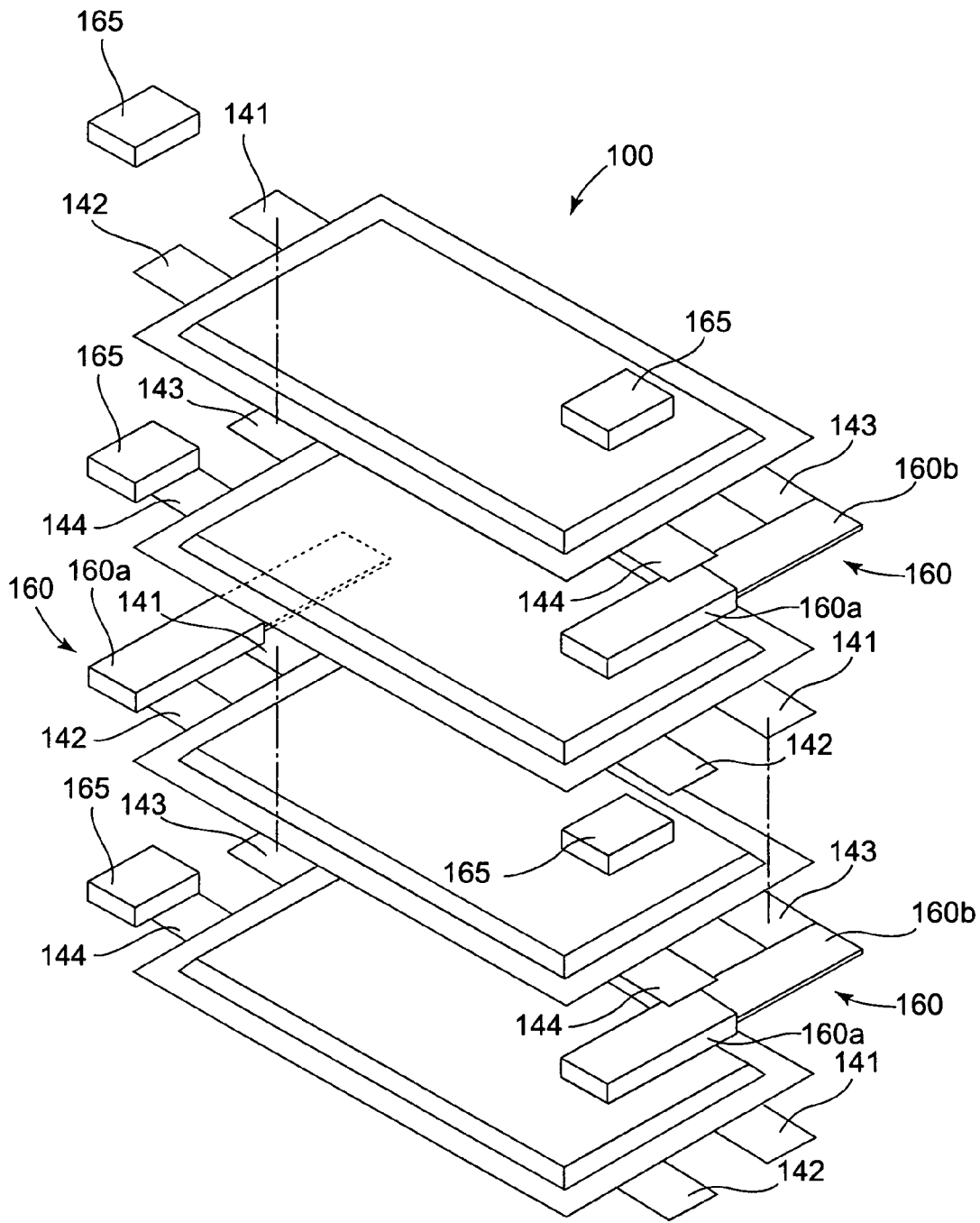
FIG. 9 is a perspective view which shows the appearance of a lamination of a plurality of flat batteries for Embodiment 2.

Next, there is an explanation of a battery pack 150 that includes a number of serially connected flat batteries 100. FIG. 9 is a perspective view which shows a battery pack of Embodiment 2 which laminated a plurality of flat batteries 100.

As shown in FIG. 9, the flat batteries 100, there is a stack of the flat batteries 100 which are shown in FIG. 8, so that the output section 141 and the output section 143 are stacked in the same row, in addition so that the voltage detection section 142 of the voltage detection section 144 are stacked in the same row and there is alternately stacking in the direction of the flat batteries 100. By forming the lamination in this way, the output section are arranged in one row in the stack direction of the flat batteries 100, and at the same time the voltage detection section is also stacked in one row in the stack direction.

That is, as shown in FIG. 9, the output section 141 in the output section 143 which are arranged in the stack direction are both connected, and because the flat battery 100 companions may be short-circuited, the output section 141 of the flat battery 100 and the output section 143 which is positioned at the lower layer (lower side when the stack direction of the flat batteries is assumed to be up and down) of the flat battery 100 are electrically connected by welding and the output section 143 of the flat battery 100 and the output section 141 which is positioned at the lower layer of the flat battery 100 are electrically isolated by using the spacers 60.

On the other hand, because it is necessary for the voltage detection section 142 and the voltage detection section 144 of all the flat batteries 100 to be electrically isolated, they are isolated using the spacer 160 and the spacer 165. For the spacer 160, the thickness of the part 160a which faces the voltage detection section 142 and the voltage detection section 144 as shown in FIG. 9 forms a thickness greater than the thickness of the part 160b which faces the output section 141 and the output section 143. In addition, the thickness of the spacer 165 is the same as the thickness of the part 160a which faces the voltage detection section 142 and the voltage detection section 144 for the spacer 160.

FIG. 9 shows an example for the case when stacked flat batteries 100 as a simplification of the invention, but in reality, there are many cases when there are more than four, and battery packs are formed by stacking eight flat batteries 100. There is formed a battery pack as shown into FIG. 10 by stacking eight flat batteries 100 and four spacers 160 and four spacers 165 on either side.

Figure 10:
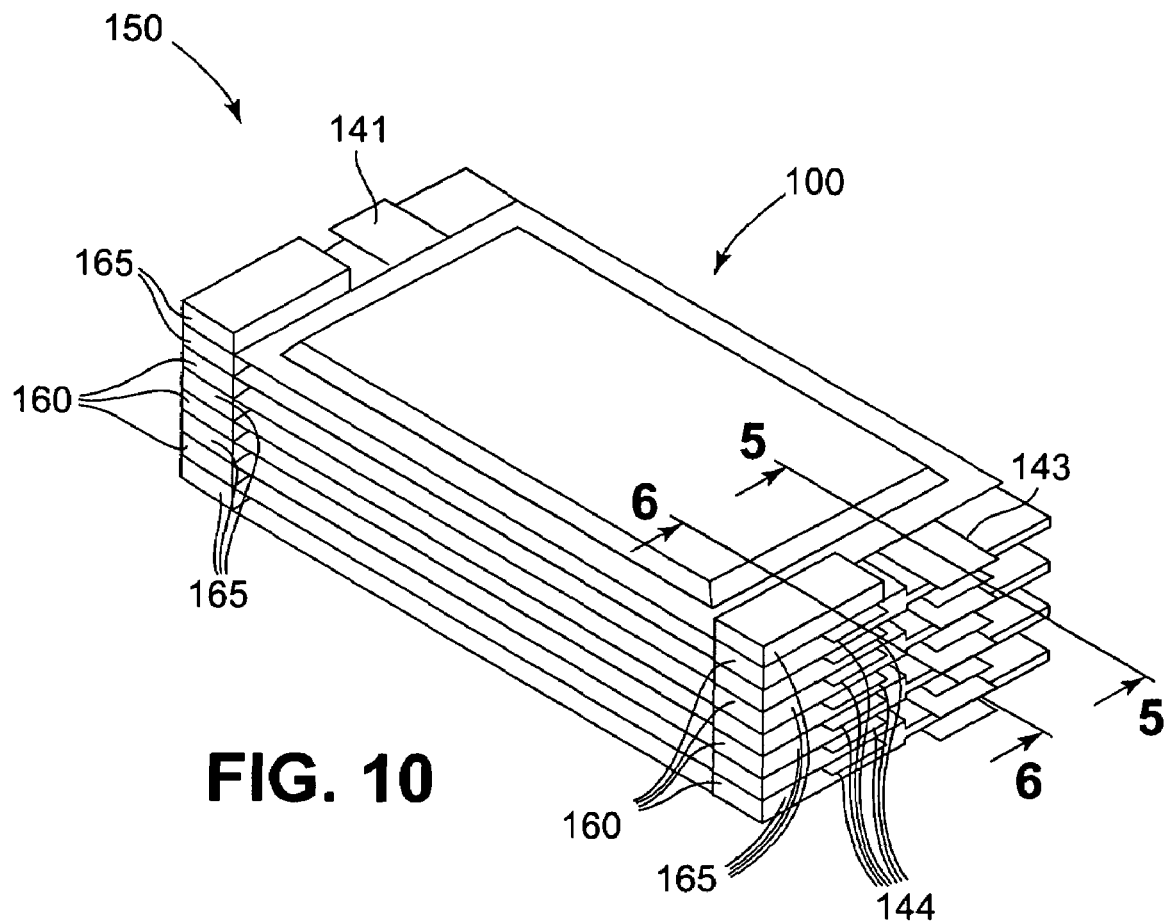
FIG. 10 is a perspective view which shows a battery pack resulting from the lamination of a plurality of flat batteries for Embodiment 2.
Figure 11:
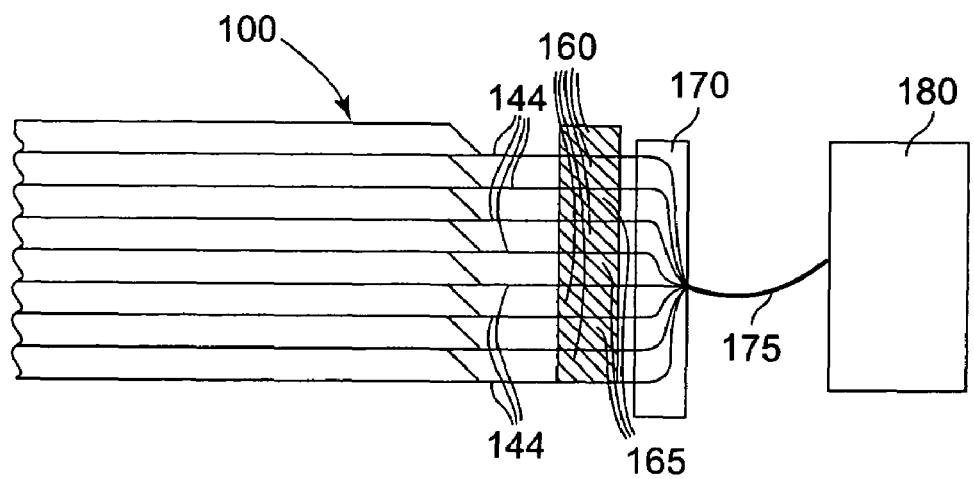
FIG. 11 is a cross-sectional view which is seen along the line 6-6 of FIG. 10.

FIG. 10 is a perspective view which shows a battery pack 151 that stacked a plurality of flat batteries 100, and FIG. 11 is a cross-sectional view seen along the 6-6 line of FIG. 1. The cross-sectional view that is seen along the line 5-5 of FIG. 10 is the same as FIG. 5 if 143 replaces 40a FIG. 5, 141 replaces 42, and 160 replaces 60. There is shown in FIG. 10 and FIG. 11 the appearance of the battery pack that was formed by stacking eight flat batteries 100.

From the inferences of FIG. 5, the output section 141 and the output section 143 are connected at the gap between the spacers 160. Because there is a gap between the spacers 160b, the output sections 141 and 143 are connected by welding, and are not fixed with respect to the stack direction, that is they are moveable. On the other hand, as shown in FIG. 10 and FIG. 11, the voltage detection section 142 and the voltage detection section 144 are sandwiched by the spacer 160a and the spacer 165, and are fixed at a constant pitch. In the voltage detection section 142 and the voltage detection section 144 that are fixed, as shown in FIG. 11, there is easily inserted a multi-electrode contact 170 so as to be able to connect every voltage detection section 142 and voltage detection section 144 once by bundling the voltage detection line 175. The inserted multi-electrode contact 170 is connected to the control device 180 by means of the voltage detection line 175, and based on the voltage values of the flat batteries 100 which are detected separately, the results controlling of the degraded condition of each flat battery 100 or charging and discharging.

Various embodiments of the invention have been described. These and other embodiments are within the scope of the following claims.

The invention claimed is:

1. A battery pack comprising:
   a plurality of flat batteries, each of the flat batteries comprising:
   battery elements that generate power;
   an exterior member that seals the battery elements within an interior region thereof; and
   plate-shaped electrode terminals that conduct to an exterior of the exterior member and connect to the battery elements within the interior region, wherein the electrode terminals comprise an output section and a voltage detection section that connects a voltage detection line to a control device that detects an output voltage, and wherein the electrode terminals define a notch between the output section and the voltage detection section to separate the output section and the voltage detection section, wherein both the output section and voltage detection section extend from a same side of the exterior member;
   wherein the flat batteries are serially connected so that the output sections of the flat batteries are connected together and
   wherein the voltage detection sections of the plurality of flat batteries are alternately stacked with spacers which are plate-shaped insulation members, and wherein by sandwiching the voltage detection sections between the spacers, the detection section is fixed with respect to a stack direction of the flat batteries.

2. The battery pack of claim 1, wherein each of the flat batteries has a first sheet member and a second sheet member, and wherein outer edges of the first sheet and second sheet are joined at a junction region, and wherein the electrode terminals extend to outside of the flat battery from the junction region.

3. A battery pack comprising:
   a plurality of flat batteries, each of the flat batteries comprising:
   battery elements that generate power;
   an exterior member that seals the battery elements within an interior region thereof; and
   plate-shaped electrode terminals that conduct to an exterior of the exterior member and connect to the battery elements within the interior region, wherein the electrode terminals comprise an output section and a voltage detection section that connects a voltage detection line to a control device that detects an output voltage, and wherein the electrode terminals define a notch between the output section and the voltage detection section to separate the output section and the voltage detection section, wherein both the output section and voltage detection section extend from a same side of the exterior member;
   wherein the flat batteries are serially connected so that the output sections of the flat batteries are connected together; and
   wherein the voltage detection section of each of the plurality of flat batteries is fixed with respect to a stack direction at a location outboard of the exterior member, and wherein the output section of each of the plurality of flat batteries is moveable with respect to the stack direction.

4. A flat battery comprising:
   a battery element including multiple positive electrodes and multiple negative electrodes;
   an exterior member that seals the battery element, wherein the battery element is within an interior region of exterior member; and
   a first electrode terminal that conducts to an exterior of the exterior member and is electrically coupled within the exterior member to only one of all the negative electrodes and all the positive electrodes, wherein the first electrode terminal comprises an output section and a voltage detection section, and wherein the first electrode terminal defines a notch between the output section and the voltage detection section.

5. The flat battery of claim 4, wherein the output section and the voltage detection section extend in a same direction away from the exterior member.

6. The flat battery of claim 4, wherein the output section and the voltage detection section extend from a same side of the exterior member.

7. The flat battery of claim 4, further comprising:

a second electrode terminal that conducts to the exterior of the exterior member and is electrically coupled to the other one of all the negative electrodes and all the positive electrodes.

8. The flat battery of claim 7, wherein only the first electrode terminal and the second electrode terminal conduct to the exterior of the exterior member.

9. The flat battery of claim 3, wherein a side of the output section partially defining the notch and a side of the voltage detection section partially defining the notch are parallel.

10. The battery pack of claim of claim 1, wherein a side of the output section partially defining the notch and a side of the voltage detection section partially defining the notch are parallel.

* * * * *